Inventor:
Bernard C. Evans,
by *Harry E. Dunham*
His Attorney.

Patented July 22, 1947

2,424,443

UNITED STATES PATENT OFFICE 2,424,443

DYNAMOELECTRIC MACHINE

Bernard C. Evans, Fort Wayne, Ind., assignor to General Electric Company, a corporation of New York Application December 6, 1944, Serial No. 566,834

7 Claims. (Cl. 171—252)

My invention relates to dynamoelectric machines and more particularly to an improved construction for the stationary member of a dynamoelectric machine and a method of making the same.

An object of my invention is to provide an improved and simplified member for a dynamoelectric machine and a method of making the same.

Another object of my invention is to provide an improved stationary member for a dynamoelectric machine having a laminated core with a simplified frame for retaining the core in assembled relationship and to a method of making the same.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
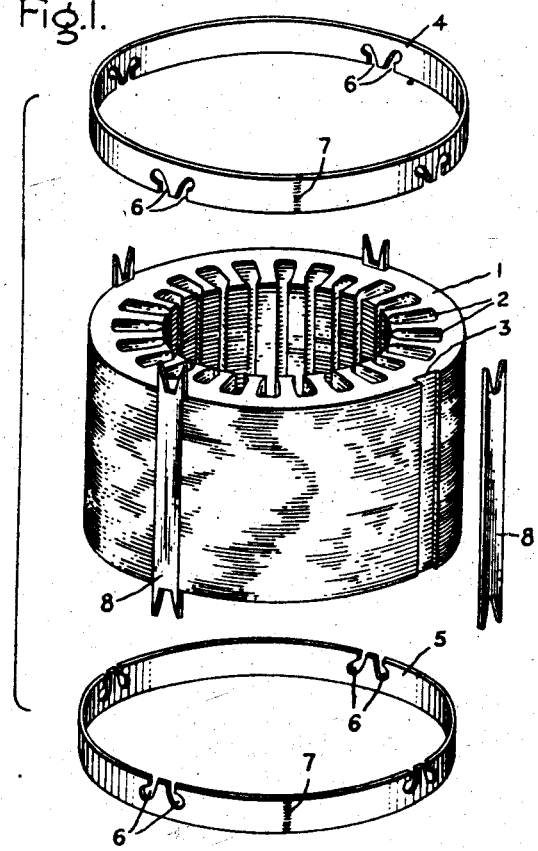
Figure 3:
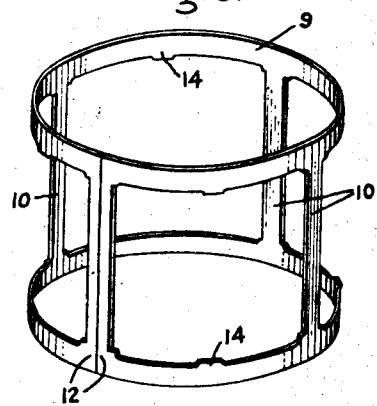
Figure 2:
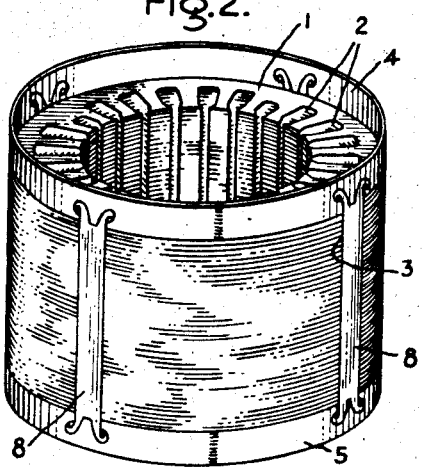

In the drawing, Fig. 1 is an exploded view of the parts forming one embodiment of my improved dynamoelectric machine member prior to assembly; Fig. 2 is a perspective view of a dynamoelectric machine, with the core and frame completely assembled, of the type shown in Fig. 1; Fig. 3 is a perspective view of a frame provided with another embodiment of my invention; and Fig. 4 is a perspective view of an assembled core with a frame of the type shown in Fig. 3.

Referring to the drawing, I have illustrated in Figs. 1 and 2 a dynamoelectric machine according to one embodiment of my invention in which the stationary member of the machine is formed with a core including a plurality of laminations 1 of magnetic material, each of which is formed with a plurality of winding slots 2 extending axially therethrough about the inner periphery thereof. Each of these laminations is formed with a plurality of circumferentially spaced apart grooves 3 in the outer periphery thereof which are assembled to provide longitudinally extending grooves through the outer periphery of the core of the machine. These laminations are then suitably compressed under a predetermined pressure, and a retaining frame is arranged around the laminations for holding them in assembled relationship. In making this frame, a pair of end rings 4 and 5 are formed from a strip of non-magnetic sheet metal with a plurality of circumferentially spaced apart pairs of outwardly extending curved notches 6 in one side of each strip of material. These metal strips are then formed into rings, and the ends thereof are welded together, as indicated at 7, to provide oppositely extending notches in the side of the two rings. A plurality of rib elements 8 are then formed with bifurcated ends and arranged in the grooves in the assembled laminations so that the outer surfaces thereof are substantially even with the outer periphery of the laminated core, as shown in Fig. 1, and the end rings 4 and 5 are arranged with the notches 6 on the side towards the core and over the bifurcated ends of the ribs 8. These end rings are then pressed over the bifurcated ends of the ribs until the bifurcated ends are curved into and mechanically locked in the notches in the rings, thus securing the rings together and retaining the core in assembled relationship, as shown in Fig. 2. The number of notches 3 formed in the laminations and the corresponding number of ribs 8 may be varied according to the size of the machine, and the distance between the inner ends of the bifurcated ends of the ribs 8 should be made just slightly less than the predetermined axial length of the assembled laminations forming the core of the machine.

Figure 4:
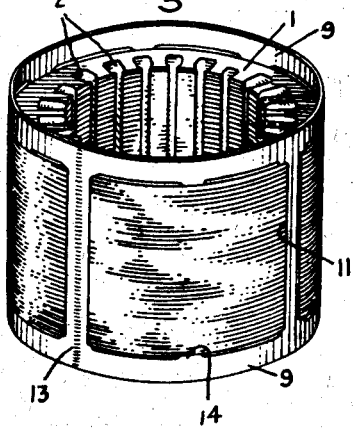

Figs. 3 and 4 illustrate another embodiment of my invention in which the frame is formed of a non-magnetic sheet metal stamping including end ring elements 9 which are formed integral with rib elements 10 secured to the end rings 9. The sheet metal stamping is then rolled up about an arbor to a diameter slightly less than the diameter of the bottom of the grooves 11 formed in the outer periphery of the core, and this frame is then arranged around the assembled laminations 1 with the rib elements 10 in the groove 11 in the assembled laminations, such that the frame will snap into position about the laminations and retain them under the desired pressure after the abutting edges 12 of one of the ribs is welded together, as indicated at 13 in Fig. 4. As shown in these figures, a plurality of circumferentially spaced apart projections 14 may be formed on the inner side of the rings 9 to provide abutments against the outer end laminations of the core, such that the end rings 9 are spaced slightly axially out of engagement with the end laminations. The projecting abutments, however, may be omitted if desired.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A stationary member for dynamoelectric machines comprising an annular magnetic structure with a plurality of longitudinally extending grooves in the outer periphery thereof, and a frame around said magnetic structure comprising end rings arranged on each side of said magnetic structure in engagement therewith and having the ends thereof welded together, and means including longitudinally extending ribs arranged in said grooves with the outer surface thereof substantially even with the outer periphery of said core and secured to and extending between said end rings for securing together said end rings and retaining said magnetic structure in assembled relationship.

2. A dynamoelectric machine stationary member including a laminated core of magnetic material with a plurality of longitudinally extending grooves in the outer periphery thereof, a frame around said core having an end ring arranged in engagement with each side of said core, each of said rings having a plurality of pairs of outwardly curved notches in the side thereof adjacent said core and corresponding to said plurality of grooves, and means including rib elements arranged in said grooves and having bifurcated ends mechanically locked in said ring notches for securing said rings together and retaining said core in assembled relationship.

3. A dynamoelectric machine member including a laminated core of magnetic material with a plurality of circumferentially spaced apart longitudinally extending grooves in the outer periphery thereof, a frame around said core having an end ring arranged in engagement with each side of said core, each of said rings having a plurality of sets of notches in the side thereof adjacent said core and corresponding to said plurality of grooves, and means including rib elements arranged in said grooves and having bifurcated ends mechanically locked in said ring notches for securing said rings together and retaining said core in assembled relationship.

4. A dynamoelectric machine member including a laminated core of magnetic material with a plurality of circumferentially spaced apart longitudinally extending grooves in the outer periphery thereof, a frame around said core having an end ring arranged in engagement with each side of said core adjacent the outer periphery thereof, each of said rings having a plurality of circumferentially spaced apart sets of outwardly curved notches in one side thereof corresponding to said plurality of grooves, and means including a plurality of rib elements arranged in said grooves and having bifurcated ends extending into and mechanically locked in said ring notches for securing said rings together and retaining said core in assembled relationship.

5. A method of making a dynamoelectric machine member including assembling a plurality of laminations to form a core, forming end rings with circumferentially spaced apart pairs of outwardly curved notches in one side thereof, forming a plurality of ribs with bifurcated ends and arranging said ribs in said grooves, and arranging the end rings with the notches therein on the side towards the core and pressing the end rings over the bifurcated ends of the ribs until the bifurcated ends are curved into and mechanically locked in the notches securing the end rings together and retaining the core in assembled relationship.

6. A dynamoelectric machine member including a plurality of laminations of magnetic material forming a core, end rings with circumferentially spaced apart outwardly curved notches in one side thereof, a plurality of ribs with bifurcated ends arranged around said core, said end rings being arranged with the notches therein on the side towards the core and over the bifurcated ends of the ribs such that the bifurcated ends of the ribs are curved into and mechanically locked in the notches in the rings securing the end rings together and retaining the core in assembled relationship.

7. A method of making a dynamoelectric machine member including forming a plurality of laminations of magnetic material with a plurality of circumferentially spaced apart grooves in the outer periphery thereof, assembling the laminations to form a core with said grooves in alignment to provide longitudinally extending grooves in the outer periphery of the core, forming end rings with circumferentially spaced apart pairs of outwardly curved notches in one side thereof corresponding to said plurality of grooves, forming a plurality of ribs with bifurcated ends and arranging the ribs in said core grooves, arranging the end rings with the notches therein on the side towards the core and pressing the end rings over the bifurcated ends of the ribs until the bifurcated ends are curved into and mechanically locked in the notches securing the end rings together and retaining the core in assembled relationship.

BERNARD C. EVANS.

REFERENCES CITED

The following references are of record in the file of this patent:

UNITED STATES PATENTS

| Number | Name | Date |
|---|---|---|
| 340,117 | Holt | Apr. 20, 1886 |
| 1,711,414 | Kanaky | Apr. 30, 1929 |
| 1,822,096 | Hollander | Sept. 8, 1931 |